United States Patent Office 3,347,919
Patented Oct. 17, 1967

3,347,919
POLYCYCLIC DIAMINES
Elmore Louis Martin, Wilmington, Del., assignor to E. I. du Pont de Nemours and Company, Wilmington, Del., a corporation of Delaware
No Drawing. Filed Nov. 30, 1966, Ser. No. 597,884
5 Claims. (Cl. 260—563)

This application is a continuation-in-part of my copending application S.N. 454,202, filed May 7, 1965, now Patent No. 3,301,827 issued Jan. 31, 1967, which is a continuation-in-part of my abandoned application Ser. No. 46,386, filed Aug. 1, 1960, which in turn is a continuation-in-part of my abandoned application Ser. No. 819,013, filed June 9, 1959.

This invention relates to new and useful polycyclic diamines.

The textile fiber industry is constantly endeavoring to obtain fibers of synthetic polymeric material which have good mechanical properties and which can retain these properties by withstanding the degradative effects of heat and oxidation. Molecular structure is a primary factor in affecting the mechanical properties of polymers due to its direct influence on crystallinity and orientation. Hence, it is an object of this invention to provide novel diamines for use in preparing polymers of improved properties.

Other objects will become more apparent in the course of the following specification and claims.

The novel polycyclic diamines of this invention have the structural formula selected from the class comprising:

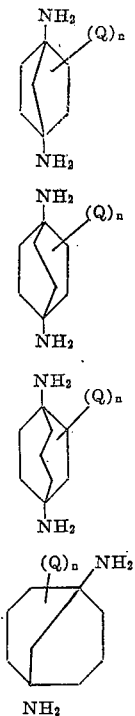

and

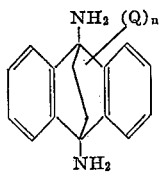

wherein Q is a monovalent organic radical selected from the class consisting of lower alkyl, cycloalkyl, aryl, lower alkyl substituted aryl, and aryl substituted lower alkyl, and $n$ is 0, 1 or 2. Preferably $n$ is zero. By the term "lower alkyl" is meant an alkyl group of up to about five carbon atoms, e.g., methyl, propyl, neo-pentyl.

The diamines of this invention can be prepared from the corresponding dinitro compounds or dicarboxylic acids. The bicyclo[2.2.2]octane-1,4-dicarboxylic acid that is used in Example I below, as well as the bicyclic dicarboxylic acids bearing alkyl, cycloalkyl, aryl, alkaryl, and aralkyl substituents on the bicyclic ring, can be prepared by the procedure of P. C. Guha, Chem. Ber. 72B. 1359 (1939). This procedure involves cyclization of diethyl succinate to diethyl succinoyl succinate, followed by reaction with ethylene bromide to form diethyl 2,5-dioxo-bicyclo[2.2.2]octane-1,4-dicarboxylate which on reduction and hydrolysis, yields the desired dicarboxylic acid. In preparing the diamines of this invention from the dicarboxylic acid, the acid is first converted to the corresponding acid halide, which in turn is transformed to the corresponding acyl azide, the decomposition of which gives the corresponding diisocyanate and the latter on hydrolysis yields the diamine. The sequence of reaction, illustrated with bicyclo[2.2.2]octane-1,4-dicarboxylic acid is:

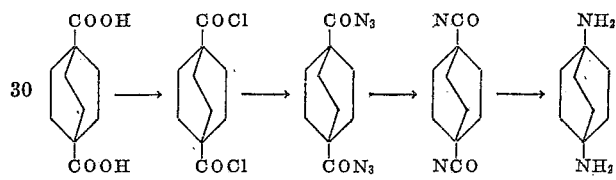

In an alternative method which is particularly useful for preparing bridgehead bicyclic heptanediamines, a dinitroheptane is dissolved in a suitable solvent, e.g., diethyl ether, and the solution is then added slowly with stirring to a solution of a reducing agent, for example, lithium aluminum hydride. The mixture is stirred to insure complete reaction, excess lithium aluminum hydride is decomposed with moist diethyl ether, and the mixture is then treated with aqueous caustic alkali. The ether layer is separated with the ether removed by evaporation. The free amine is purified by recrystallization from diethyl ether solution.

The following examples are cited to illustrate the inventoiin and are not intended to limit it in any manner. The term "polymer melt temperature," is conventionally defined as the temperature at which a polymer sample becomes sufficiently molten to leave a trail when moved across a hot metal surface under moderate pressure.

*Example I*

This example shows the preparation of bicyclo[2.2.2]octane-1,4-diamine.

A mixture of 15 grams bicyclo[2.2.2]octane-1,4-dicarboxylic acid and 25 ml. redistilled thionyl chloride is boiled under reflux for 24 hours. After evaporation of excess thioyl chloride, the residue is distilled at 108–120° C./2.5 mm. to yield 16.6 g. of 1,4-bicyclo[2.2.2]octane dicarbonyl chloride. This is dissolved in 50 ml. of acetone and the solution added to a chilled solution of 13 g. of sodium azide in 40 ml. of water. The mixture is stirred for one hour at 10° C. (±2° C.) and the diacyl azide is then collected by filtration. The azide is dissolved in 60 ml. of benzene, the solution added slowly to 80 ml. of benzene at 70° to 75° C., and the resulting solution boiled under reflux for two hours. The diisocyanate so formed, while still in solution in benzene, is heated with 100 ml. of concentrated hydrochloric acid for two hours and the aqueous layer evaporated to dryness.

The amine hydrochloride so formed is covered with a solution of 20 g. of potassium hydroxide in 20 ml. of water and with 100 ml. of diethyl ether. The ether layer is separated, dried over solid KOH, and the solution distilled to yield 2.8 g. of solid (B.P. 139° C./79 mm.) which upon recrystallization from ether gives fine white needles with a melting point of 79–83° C. The results of elemental analysis indicated the product to be a hydrate of bicyclo[2.2.2]octane-1,4-diamine.

Calcd. for $C_8H_{16}N_2 \cdot H_2O$: C, 60.72; H, 11.46; N, 17.71; O, 10.11
Found: C, 60.56; H, 10.94; N, 17.82; O, 10.68

The neutral equivalent calculated for $C_8H_{16}N_2 \cdot H_2O$ is 79.1 whereas it is found to be 79.0.

In a similar experiment starting with 16 g. of bicyclo[2.2.2]octane-1,4-dicarboxylic acid, the acyl chloride is obtained on distillation at 92–95° C./0.3 mm., M.P. 69–71.5° C., and the bicyclo[2.2.2]octane-1,4-diammonium chloride obtained as above. This amine hydrochloride (12.1 g.) is stirred with 20 g. of 85% KOH in 100 ml. of diethyl ether, the ether layer decanted, and evaporated to dryness. The residue is sublimed at 65° C./2 mm., and recrystallized from diethyl ether to yield 6 g. of bicyclo[2.2.2]octane-1,4-diamine, M.P. 62–64° C. The result of the elemental analysis of the diamine is:
Calcd. for $C_8H_{16}N_2$: C, 68.52%; H, 11.50%; N, 19.98%; N.E., 70.1. Found: C, 68.32%; H, 11.22%; N, 20.53%; N.E., 71.

The protron magnetic resonance of the bicyclo[2.2.2]-octane-1,4-diamine contains only one band, a strong resonance at the point assignable to methylene or amino protons.

The infrared spectrum of the diamine contains bands at 3.4 and $3.5\mu$ assignable to methylene groups and at 2.95 and $3.05\mu$ assignable to amino groups.

In place of the bicyclo[2.2.2]octane-1,4 - dicarboxylic acid used in Example I, there can be used
2-phenylbicyclo[2.2.2]octane-1,4-dicarboxylic acid,
2-cyclohexylbicyclo[2.2.2]octane-1,4-dicarboxylic acid,
2-octylbicyclo[2.2.2]-octane-1,4-dicarboxylic acid,
2,5-dimethylbicyclo[2.2.2]octane-1,4-dicarboxylic acid,
2,5-dibenzylbicyclo[2.2.2]octane-1,4-dicarboxylic acid,
2,5-di-p-tolylbicyclo[2.2.2]octane-1,4-dicarboxylic acid,
bicyclo[3.2.2]nonane-1,5-dicarboxylic acid,
6-ethylbicyclo[3.2.2]nonane-1,5-dicarboxylic acid,
6,8-dicyclopentylbicyclo[3.2.2]nonane - 1,5 - dicarboxylic acid, and the like.

If the above dicarboxylic acids are substituted for the bicyclo[2.2.2]octane-1,4-dicarboxylic acid in the process of Example I, the following bridgehead diamines, respectively, will be obtained:

2-phenylbicyclo[2.2.2]octane-1,4-diamine
2-cyclohexylbicyclo[2.2.2]octane-1,4-diamine
2-octylbicyclo[2.2.2]octane-1,4-diamine
2,5-dimethylbicyclo[2.2.2]octane-1,4-diamine
2,5-dibenzylbicyclo[2.2.2]octane-1,4-diamine
2,5-di-p-tolylbicyclo[2.2.2]octane-1,4-diamine
bicyclo[3.2.2]nonane-1,5-diamine
6-ethylbicyclo[3.2.2]nonane-1,5-diamine
6,8-dicyclopentylbicyclo[3.2.2]nonane-1,5-diamine

*Example II*

This example illustrates the preparation of bicyclo[2.2.1]heptane-1,4-diamine.

A chilled solution of 13.8 g. of nitrogen dioxide and 19.2 g. of bicyclo[2.2.1]heptane in 15 ml. of chlorobenzene is dropped over a period of 2 hours into a heated (400° C.) reaction tube packed with glass beads.

The products are collected in a trap maintained at 0° C., dried over anhydrous magnesium sulfate, and distilled. Three fractions are separated as follows:

| Fraction | B. P., ° C. | Product |
| --- | --- | --- |
| 1 | 100–108 | Bicyclo[2.2.1]heptane. |
| 2 | 42–48/42 mm | Chlorobenzene. |
| 3 | 50–58/2 mm | 1-nitrobicyclo[2.2.1]heptane. |

Fraction 3, the mononitro derivative of bicyclo[2.2.1]heptane, has an $n_D^{25} = 1.4782$.

Two grams of the mononitro derivative, prepared as above, and 1.0 g. of nitrogen dioxide in 2.5 ml. of chlorobenzene is dropped over a period of 25 minutes into a heated (400° C.) reaction tube packed with glass beads. The products are collected in a trap cooled in ice water, and distilled up to 53° C./1.5 mm. to yield a viscous red residue (200 mg.) which is triturated with 2 ml. of petroleum ether. A yellow crystalline solid characterized as the 1,4-dinitro derivative of bicyclo[2.2.1]heptane is recovered, then dissolved in 5 ml. of diethyl ether and the solution added slowly to 190 mg. of lithium aluminum hydride in 10 ml. of diethyl ether. The mixture is stirred at reflux overnight. Excess lithium aluminum hydride is decomposed with moist diethyl ether, and the product which forms is treated with 10% aqueous sodium hydroxide. The ether layer is separated, dried over sodium hydroxide pellets, filtered, and the ether removed by evaporation under a nitrogen blanket. The residual crude bicyclo[2.2.1]heptane-1,4 - diamine is treated with 1.0 ml. of 10% aqueous sodium hydroxide and 0.2 ml. of benzoyl chloride for two hours. The mixture is then extracted with diethyl ether, the ether extract dried over magnesium sulfate, and the ether removed by evaporation under a nitrogen blanket. The solid residue is crystallized from methanol to yield the dibenzamide of 1,4-bicyclo[2.2.1]heptanediamine, M.P. 194–200° C. The free diamine may be obtained by hydrolysis of the benzamide. Similar results were obtained when 150 mg. of the dinitro heptane were employed.

In place of the 1,4-dinitro derivative of bicyclo[2.2.1]heptane used in this example, there can be used the 1,4-dinitro derivatives of 2 - methylbicyclo[2.2.1]heptane, bicyclo[2.2.2]octane, and the 1,5-dinitro derivatives of bicyclo[3.2.2]nonane, bicyclo[3.3.1]nonane, and the like.

The above 1,4-dinitro derivatives can be made by the procedure described for preparing the 1,4-dinitro derivative of bicyclo[2.2.1]heptane.

Substitution of the above 1,4-dinitro derivatives for the 1,4-dinitro derivative of bicyclo[2.2.1]heptane of Example II in the process of Example II leads to the formation of 2-methylbicyclo[2.2.1]heptane-1,4 - diamine, bicyclo[2.2.2]octane-1,4 - diamine, bicyclo[3.2.2]nonane-1,5-diamine, bicyclo[3.3.1]nonane-1,5 - diamine, and the like.

*Example III*

Equimolar proportions of the diamine prepared in Example I and sebacic acid are dissolved in water to form 1,4 - bicyclo[2.2.2]octanediammonium sebacate. After drying, 3.68 grams of this salt is heated in a sealed tube for one hour at 280° C., then for 1½ hours at 283° C. in a nitrogen atmosphere at atmospheric pressure, and finally for 2 hours at 283° C. under vacuum. The product, poly(bicyclo[2.2.2]oct-1,4-ylene sebacamide), has an inherent viscosity (m-cresol at 25° C.) of 0.85 and a melt viscosity of 3900 poises at 280° C.

The superior melt stability is illustrated by the fact that heating of the polymer under nitrogen atmosphere at 283° C. for 30 hours causes the inherent viscosity to drop 20% (from 0.85 to 0.68). Under similar conditions poly(hexamethylene adipamide) gels, and poly(1,1,4,4-tetramethyl tetramethylene suberamide) shows a drop in inherent viscosity of 73% (from 1.51 to 0.41).

The polymer is cut into flake and melt-spun at 260–265° C. and 250–300 p.s.i. pressure at 75 y.p.m. and drawn at a draw ratio of 2.5 at 80° C. to a 27 total-denier yarn. The filaments of poly(bicyclo[2.2.2]oct-1,4-ylene sebacamide) exhibit improved oxidation resistance, modulus, and resilience over filaments from poly(hexamethylene adipamide). The improved oxidation resistance is illustrated by the tenacity drop after a 40-hour exposure to light in a Fade-O-Meter. The tenacity drops 14% (from 0.98 gram per denier) compared to a drop of 38% (from 5.9 grams per denier to 3.6 grams per denier) for 66 nylon. Similar improvement is obtained with poly(bicyclo[2.2.1]hept-1,4-ylene sebacamide).

*Example IV*

This example illustrates the preparation of 9,10-diamino-9,10-dihydro-9,10-endoethanoanthracene.

A mixture of 50 grams of anthraquinone and 500 grams of redistilled formamide is refluxed for 8 hours, during which time the solid present initially dissolves and a second solid material begins to separate. The reaction mixture is cooled and filtered to provide a straw-yellow solid which is washed with alcohol and then with water, and again with alcohol and finally with ether to yield 43 grams of 9,10-bis-formamidoanthracene. This is hydrolyzed to the monoformyl-9,10 diaminoanthracene by refluxing for 6 hours with 60 grams of potassium hydroxide and 500 cc. of methyl alcohol. The mixture is cooled, filtered, washed with water, dried, and separated into unhydrolyzed diformyl derivative and 27.5 grams of monoformyl compound (M.P. about 300° C.). An additional 32 grams of monoformyl compound is similarly prepared. The monoformyl compound (59.5 grams) dissolves in 400 ml. of dimethylformamide quite readily and is obtained as a yellow-orange crystalline solid by addition of water to the dimethylformamide. The yield of monoformyl derivative is 26 grams.

The monoformyl-9,10-diaminoanthracene (26 grams) so obtained is heated with 600 cc. of benzene at 200–220° C. with the maximum cylinder pressure of ethylene being fed into a reaction chamber for 48 hours. The chamber is then cooled, vented, and the contents worked up to provide a dark brown benzene solution mixed with a large mass of slightly discolored crystalline material. This mixture is then filtered to provide a solid which weighs 21 grams and is essentially the pure condensation product of the diaminoanthracene and ethylene.

Some of the reaction product obtained from the condensation is sublimed in a high vacuum at 214° C. bath temperature. The sublimate is recrystallized from decahydronaphthalene to give pure white needles melting sharply at 242° C.

More monoformyl-9,10-diaminoendoethanoenthracene is prepared as above, and 88 grams of it is hydrolyzed overnight by mixing with 300 grams of potassium hydroxide in 800 cc. of methanol and an equal volume of water to yield 81 grams of product. This product is refluxed for 6 hours with 450 grams of potassium hydroxide in 750 cc. of methyl alcohol. The mixture is then cooled and diluted with 1 liter of water. The product crystallizes well and is then recrystallized from aqueous alcohol using decolorizing carbon to give 58 grams of a crystalline product melting on the hot stage at 147° to 149° C.

In order to adequately characterize and completely hydrolyze this material, a 2 gram sample is dissolved in 50 cc. tetrahydrofuran added to 50 cc. of 3 molar methyl magnesium bromide. This mixture is stirred for 6 hours, allowed to stand overnight, and then refluxed for 4 hours. It is then poured into ammonium chloride-water and filtered to yield 1.8 grams of solid which melts at about 125° C. The melting point after recrystallization from ethyl alcohol containing a trace of sodium hydroxide to prevent carbonate formation is 147–148° C. Further recrystallization from benzenecyclohexane gives a product melting at 148°–148.5° C. without intermediate phase change. These melting points are observed repeatedly when the compound is obtained from alcohol.

Calcd. for $C_{16}H_{16}N_2$: C, 81.35; H, 6.7; N, 11.9
Found: C, 81.37 81.29; H, 6.91 6.91; N, 11.7 11.7.

*Example V*

Equimolar proportions of the diamine of Example IV and isophthalic acid are dissolved in water to form the salt 9,10-dihydroendoethanoanthracene-9,10-diammonium isophthalate. After drying, this salt is sealed in a tube and heated for 1½ hours at 220° C., then for ¼ hour at 260° C. in nitrogen atmosphere at atmospheric pressure, and finally for 1½ hours at 260° C. under vacuum (about 0.03 mm.). The product, melt-spinnable poly(9,10-dihydro-9,10-endoethanoanthr-9,10-ylene isophthalamide), has a polymer melt temperature of 274° C.

*Example VI*

Dry 1,4-bicyclo[2.2.2]octane diammonium suberate (2 grams), prepared from the diamine of Example I and suberic acid, is placed in a tube which is then evacuated, sealed and heated at 275° C. for 20 minutes, and then at 220° C. for two hours. The polymer is then heated at 255° C. for one hour under nitrogen at atmospheric pressure. The tube is then evacuated and the polymer heated at 275° C. under reduced pressure for one hour. The resulting polymer, poly(bicyclo[2.2.2]oct-1,4-ylene suberamide), is clear, has a melting point of 170° C., and an inherent viscosity (in m-cresol) of 0.42. Melt extrusion of the polymer yields filaments which exhibit the same improved properties over poly(hexamethylene adipamide) as indicated in Example III. The polymer is cut into flake which is formed into a clear, colorless, brittle film in a press at 130° C. and 1000 p.s.i. The film shows an excellent oxidation resistance.

Where in the above examples thionyl chloride has been used to convert the acid to the corresponding acyl halide, it is to be understood that in its place there can be used other halides, such as thionyl bromide, phosphorous pentachloride, phosphorous oxychloride, and the like.

The formation of the acyl halide can be carried out in the absence or presence of an inert reaction medium, e.g., a chlorinated hydrocarbon such as carbon tetrachloride, chloroform, monochlorobenzene, and the like.

In the reaction between the thionyl halide and the carboxylic acid, the amount of thionyl halide, or equivalent, is at least two moles per mole of acid. Generally, however, an excess of thionyl halide is used and this excess can be up to 100 moles of thionyl halide, or equivalent, per mole of acid.

The conversion of the acid halide to the azide is carried out at temperatures which are usually below ambient and most generally between 0° and 20° C. in the presence of a reaction medium, which can be water or an organic solvent, e.g., dioxane, tetrahydrofuran, methyl ethyl ketone, etc.

The amount of alkali metal azide used in converting the acid halide to the azide is at least two moles per mole of acid halide. Generally, however, the amount of azide will be in the range of 2 to 5 moles per mole of acid halide.

In the step of forming the diisocyanate from the azide, the reaction can be conducted in the presence or absence of a reaction medium at temperatures in the range of 30° to 100° C., preferably 40° to 85° C. Although benzene constitutes a preferred medium, in its place there can be used cyclohexane, methylcyclohexane, and the like.

In place of hydrochloric acid there can be used other strong inorganic acids to convert the diisocyanate through the corresponding diamine to the diamine salt. The conversion is effected by heating the diisocyanate and acid at 50° to 150° C.

Usually the amount of hydrochloric acid, or other strong inorganic acid, employed in converting the diisocyanate to the diamine which, in turn, is converted to the diamine salt, is in the range of 6 to 50 moles per mole of diisocyanate.

In isolating the diamine from the salt any alkali can be used. Convenient and preferred alkalies are sodium and potassium hydroxides. The amount of alkali metal hydroxide employed is from 2 to 100 moles per mole of amine salt and preferably from 3 to 10 moles.

The polycyclic bridgehead diamines of this invention find their primary utility as reactants in preparing polyamides of fiber-forming molecular weight which have excellent mechanical and chemical properties. In addition, the diamines may be converted to derivatives, such as diisocyanates by well-known methods, and the latter compounds polymerized with suitable reactants to provide useful polymers of fiber-forming molecular weight.

The improved physical and chemical properties of the polymers formed from the diamines of this invention are believed to be due at least in part to the rigid cyclic structure of the divalent polycyclic radical in the polymer chain, and also to the fact that the functional groups entering into the polymerization reaction are attached to bridgehead carbon atoms which do not contain hydrogen substituents. This latter requirement is believed necessary to provide stability against oxidative attack. The relatively inflexible structure of the divalent polycyclic structure reduces chain flexibility which is an important factor in determining the melting point of the polymer.

It will be apparent that many widely different embodiments of this invention may be made without departing from the spirit and scope thereof, and therefore, it is not intended to be limited except as indicated in the appended claims.

What is claimed is:

1. A polycyclic diamine selected from the class consisting of:

(1)

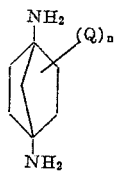

(2)

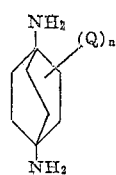

(3)

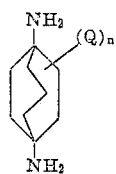

and (4)

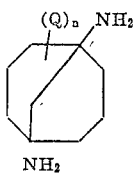

and (5)

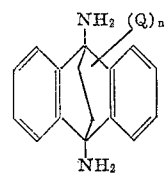

wherein Q is a monovalent organic radical selected from the class consisting of lower alkyl, cycloalkyl, aryl, lower alkyl substituted aryl, and aryl substituted lower alkyl and $n$ is 0, 1 or 2.

2. Bicyco[2.2.1]heptane-1,4-diamine.
3. Bicyclo[2.2.2]octane-1,4-diamine.
4. Bicyclo[3.3.1]nonane-1,5-diamine.
5. 9,10 - diamino - 9,10 - dihydro - 9,10 - endoethanoanthracene.

No references cited.

CHARLES B. PARKER, *Primary Examiner.*

P. C. IVES, *Assistant Examiner.*